Apr. 24, 1923.
P. FÖRSTER
CHUCK JAW
Filed Feb. 13, 1922
1,453,045
2 Sheets-Sheet 1
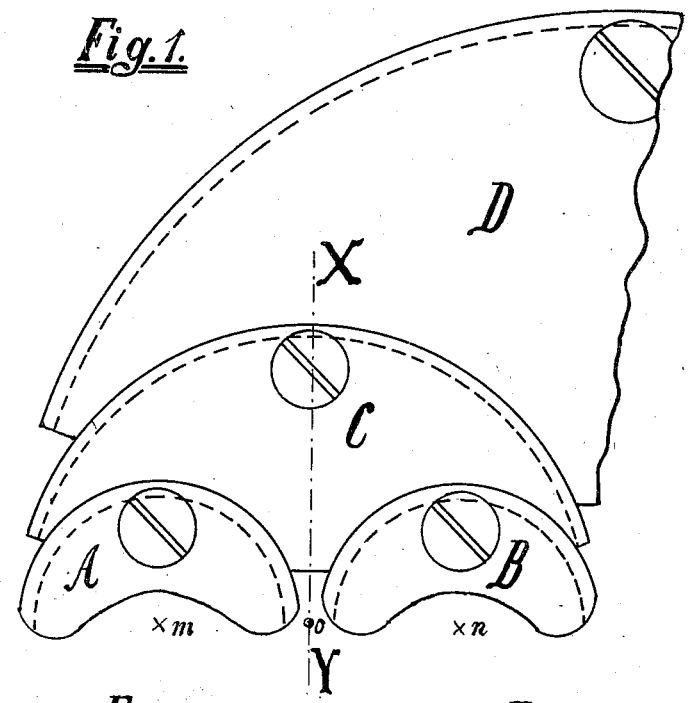
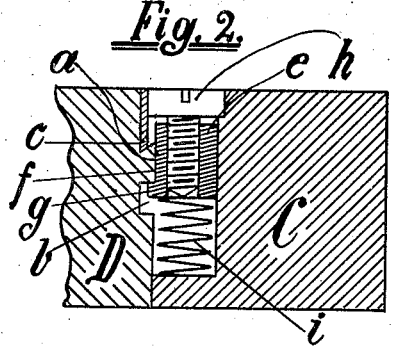
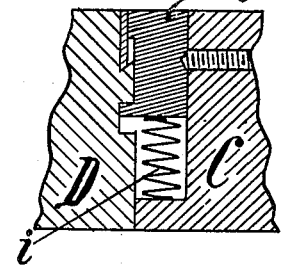

Patented Apr. 24, 1923.

1,453,045

UNITED STATES PATENT OFFICE.

PAUL FÖRSTER, OF NUREMBERG, GERMANY, ASSIGNOR TO AKTIENGESELLSCHAFT VORM. ADOLF FINZE & CO., OF NUREMBERG, GERMANY.

CHUCK JAW.

Application filed February 13, 1922. Serial No. 536,375.

*To all whom it may concern:*

Be it known that I, PAUL FÖRSTER, a citizen of the German Republic, residing at Nuremberg, Germany, have invented certain new and useful Improvements in Chuck Jaws (for which application for patent has been filed in Germany on the 9th of March, 1921), of which the following is a specification.

The chuck jaws, as now built, and composed of several nested freely oscillating parts, designed to equalize the pressure and to clamp and accommodate different shaped articles, lack the provision of some means for locking said oscillating parts in their adjusted position and preventing them from assuming their original position during the release of one article and the substitution of another of the same type and size. This is especially of importance in quantity production where large quantities of work pieces of the same type and size have to be clamped, and must always have exactly the same position relatively to the tool.

This inconvenience is obviated by the present invention which is illustrated in the accompanying drawing, wherein:—

Fig. 1 shows the clamping jaws in front elevation.

Fig. 2 is a section on line X—Y of Fig. 1.

Fig. 3 is a view similar to Fig. 2 showing a modification.

Figure 4:
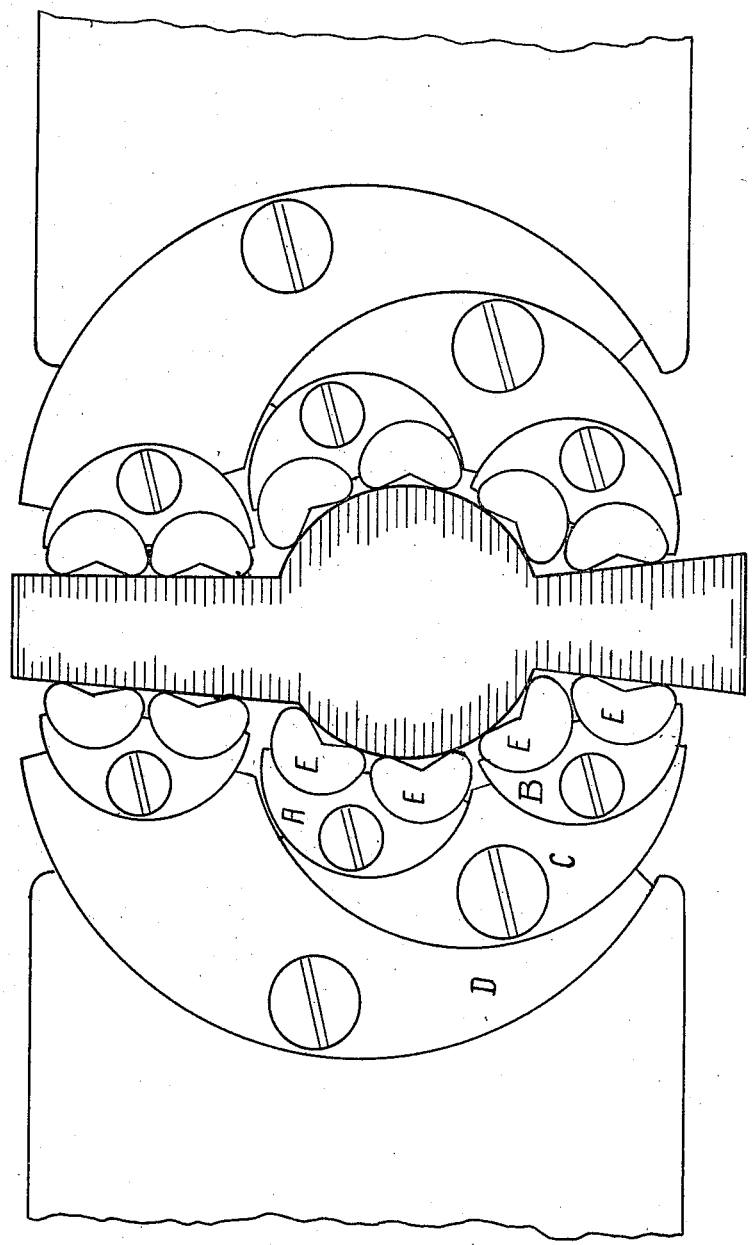
Fig. 4 shows the jaws in position to clamp an irregularly shaped article.

Referring to Fig. 1 the jaws A and B for clamping the work piece are mounted in arc-shaped recesses in the part C so that they can pivot around the centers $m$ and $n$ of said arcs or guides. The part C which comes next in size to the jaws A and B is similarly mounted in the jaw part D which comes next in size so that it can pivot around the center $o$ of its arc-shaped guide and so forth. This arrangement is known and the improvement starts from this point.

Fig. 2 (section on line X—Y of Fig. 1) shows the jaw part C which is slidably connected with the jaw part D of larger size. A tongue $a$ of dove-tailed cross section is formed in part D and a groove $b$ is cut into the same. The jaw part C is provided with a dove-tailed groove adapted to receive the tongue $a$. The connection of the parts would be non-rigid at this state.

There is further provided a tightening piece $e$ embedded in jaw part C. A shoulder $f$ cut out of this tightening piece forms a nose $g$ which engages with the groove $b$. In said tightening piece $e$ an internal thread is provided into which fits the screw $h$. Below the tightening piece $e$ there is further arranged a pressure spring $i$.

The device operates as follows:—

The spring $i$ and the tightening piece $e$ are inserted into the jaw part C prior to the assembling of parts C and D, whereupon the dove-tailed part $c$ of part C abuts the undercut side of the tongue $a$ of part D. Whilst part C is being inserted into the part D the tightening piece $e$ has to be pressed down so that its nose $g$ engages with groove $b$. The screw $h$ is tightened, whereby the two jaw parts C and D are rigidly connected the one with the other. If the screw $h$ is loosened, part C can be turned relatively to part D. Spring $i$ serves for yieldably pressing the nose $g$ against the upper part of groove $b$ even if the screw $h$ is loosened, so that, owing to the increase of friction of the two parts the one upon the other which is thus produced, the mutual rotation of the parts is rendered more difficult.

This connection can be used also for the next greater and the next smaller parts.

If it is desirable that the jaw be not locked, but the advantages which result from the uniform pressure of the spring retained, a bolt $l$ of convenient shape can be substituted for the tightening piece $e$ and screw $h$ (see Fig. 3) which serves as a stop for part C which need not be locked if it is used as end part of the jaw. It is sufficient if the parts situated behind part C are adapted to be locked.

I claim:—

A jaw part having a tongue and groove engagement with an arc shaped seat or guide and a perforation parallel to the axis of the arc and intersecting the engaging parts, a tightening piece in said perforation having a shoulder engaging a groove in the guide, a spring for yieldably pressing said shoulder against the guide and a screw for positively securing the piece in tightened position.

In testimony whereof I affix my signature in presence of two witnesses.

PAUL FÖRSTER.

Witnesses:
ALEXEI PHILIPPOFF,
ALEXANDER DE SOTE.